United States Patent
Goshen et al.

(10) Patent No.: US 11,354,671 B2
(45) Date of Patent: Jun. 7, 2022

(54) FRAUD MITIGATION USING ONE OR MORE ENHANCED SPATIAL FEATURES

(71) Applicant: EMC IP Holding Company LLC, Hopkinton, MA (US)

(72) Inventors: Idan Richman Goshen, Beer Sheva (IL); Shiri Gaber, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 34 days.

(21) Appl. No.: 16/697,554

(22) Filed: Nov. 27, 2019

(65) Prior Publication Data

US 2021/0158356 A1  May 27, 2021

(51) Int. Cl.
*G06Q 20/40* (2012.01)
*G06N 20/00* (2019.01)
*G06Q 20/38* (2012.01)

(52) U.S. Cl.
CPC ......... *G06Q 20/4016* (2013.01); *G06N 20/00* (2019.01); *G06Q 20/382* (2013.01)

(58) Field of Classification Search
None
See application file for complete search history.

(56) References Cited

U.S. PATENT DOCUMENTS

| 8,666,841 | B1 | 3/2014 | Claridge et al. |
| 8,885,894 | B2 | 11/2014 | Rowen et al. |
| 10,417,706 | B1* | 9/2019 | Simon ................ G06Q 30/0643 |
| 2008/0140576 | A1* | 6/2008 | Lewis .................. G06Q 40/025 705/67 |
| 2012/0317027 | A1* | 12/2012 | Luk ........................ G06Q 40/02 705/44 |
| 2019/0087821 | A1* | 3/2019 | Jia ........................... G06Q 40/02 |
| 2019/0295085 | A1* | 9/2019 | Ashiya ............... G06Q 20/3823 |

(Continued)

OTHER PUBLICATIONS

Treleaven, et al., Computational Finance, published in IEEE Computer ( vol. 43 , Issue: 12 , Dec. 2010 ) (Year: 2010).*

(Continued)

*Primary Examiner* — Gregory S Cunningham, II
(74) *Attorney, Agent, or Firm* — Ryan, Mason & Lewis, LLP (57) ABSTRACT

Techniques are provided for fraud mitigation using enhanced spatial features. One method comprises obtaining transaction data associated with a transaction; obtaining a machine learning module trained using training transaction data for multiple geographic areas to learn a correlation of the training transaction data with fraudulent activity for each geographic area; extracting a transaction address from the transaction data; determining a given geographic area for the transaction using the transaction address; determining values for a predefined spatial feature for a predefined region that includes the transaction address in the given geographic area using a query of an external online data source; applying the determined values for the predefined spatial feature to the machine learning module to obtain an anomaly score for the transaction; and initiating a predefined remedial step and/or a predefined mitigation step when the transaction is determined to be a predefined anomaly based on the anomaly score.

20 Claims, 6 Drawing Sheets

(56) References Cited

U.S. PATENT DOCUMENTS

2020/0288306 A1* 9/2020 Do ............... H04L 63/1433

OTHER PUBLICATIONS

Hua, et al., A Brief Review of Machine Learning and Its Application, Published in: 2009 International Conference on Information Engineering and Computer Science, entire document pertinent (Year: 2009).*

F. Carcillo, Y. L. Borgne, O. Caelen and G. Bontempi, "An Assessment of Streaming Active Learning Strategies for Real-Life Credit Card Fraud Detection," 2017 IEEE International Conference on Data Science and Advanced Analytics (DSAA), 2017, pp. 631-639, doi: 10.1109/DSAA.2017.10. (Year: 2017).*

* cited by examiner

FRAUD MITIGATION USING ONE OR MORE ENHANCED SPATIAL FEATURES

FIELD

The field relates generally to information processing systems, and more particularly, to techniques for processing transaction data in such systems.

BACKGROUND

Fraudulent activity in electronic transactions continues to increase. Fraud mitigation techniques, however, are often limited to rule-based solutions. More recently, machine learning-based fraud mitigation techniques have been deployed to identify fraudulent activity. Existing machine learning-based solutions evaluate transaction attributes, such as the monetary amount and/or payment method of a given transaction. Meanwhile, fraudulent actors continue to employ increasingly advanced and evolving techniques to avoid detection.

A need remains for improved techniques for detecting fraudulent activity.

SUMMARY

In one embodiment, a method comprises obtaining transaction data associated with at least one transaction, wherein the transaction data comprises a transaction address comprising at least one of an order placement address, a shipping address and a billing address; obtaining at least one machine learning module trained using training transaction data for a plurality of geographic areas to learn a correlation of at least a portion of the training transaction data with fraudulent activity for each geographic area; extracting the transaction address from the transaction data; determining a given geographic area of the plurality of geographic areas for the at least one transaction based at least in part on the transaction address; determining values for one or more predefined spatial features for a predefined region that includes the transaction address in the given geographic area using a query of at least one external online data source; applying the determined values for the one or more predefined spatial features for the at least one transaction to the at least one machine learning module that generates an anomaly score for the at least one transaction; and initiating one or more of a predefined remedial step and a predefined mitigation step when the at least one transaction is determined to be at least one of one or more predefined anomalies based at least in part on the anomaly score.

In various embodiments, the predefined spatial features comprise (i) a land use feature that determines a land use distribution indicating an anomaly likelihood for a plurality of land uses for at least some of the plurality of geographic areas; (ii) a crime activity feature that determines a crime use distribution indicating an anomaly likelihood for a plurality of crimes for at least some of the plurality of geographic areas; (iii) a port proximity feature that determines a port proximity distribution indicating an anomaly likelihood based at least in part on a distance between at least a portion of the transaction address and a shipping port for at least some of the plurality of geographic areas; and/or (iv) a census data feature that determines a census data distribution indicating an anomaly likelihood for a plurality of census data components for at least some of the plurality of geographic areas.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for fraud mitigation using one or more enhanced spatial features.

In one or more embodiments, improved fraud mitigation techniques are provided that automatically (i) extract contextual spatial features related to a transaction address (e.g., the shipping and/or billing addresses of a transaction) by searching one or more external online data sources, and (ii) evaluate the extracted contextual spatial features using machine learning techniques. In this manner, the transaction address can be leveraged in an indirect manner to provide an improved resilience to fraudulent activities and/or fraudulent actors.

A disclosed land use spatial feature, for example, evaluates whether a given geographic area is developed (e.g., primarily commercial or residential development), and/or a density of units for residency, and whether products purchased for a given transaction are consistent with the determined land use of the transaction address of the transaction, as discussed below. As discussed hereinafter, a number of provided spatial features have been found to correlate with fraudulent attempts. Among other benefits, the disclosed techniques for fraud mitigation using one or more enhanced spatial features can prevent and/or mitigate fraudulent activities and thereby save significant amounts of money for organizations. For example, disclosed techniques for fraud mitigation can be leveraged to improve policies for fraud alert, fraud detection and/or fraud analysis.

As noted above, fraudulent activities in electronic transactions continue to increase. Generally, a fraud occurs when a criminal (e.g., a fraudulent actor) approaches a merchant and proposes a transaction using fraudulent means, such as using a stolen or fake credit card to pay for the transaction. Thus, the merchant may not get paid for the transaction that was just made.

It has been estimated that, in the United States alone, the number of people that experienced fraud hit a record 15.4 million people in 2016 (a rise of 16% compared to 2015). In addition to direct losses, another effect to consider is the price of "false positives" with an anomaly detection system whereby a given transaction may be denied, or the purchaser may experience a stepped-up authentication. Such false positives may affect the sentiment of a customer towards the purchase and brand, and potentially also create overload in the labor costs of analysts. Even though this is a serious problem for enterprise organizations, for example, most companies today employ outdated rule-based solutions, as described above.

A shift to the digital space has opened new channels for financial services distribution, for example, and has also created a rich environment for fraudulent actors. If earlier criminals had to counterfeit client identifiers (e.g., physical documentation), now a fraudulent actor may only need an account password to access an online account and steal money. Further, not all fraud scenarios can be taken into account by analysts in advance.

One or more aspects of the disclosure recognize that machine learning (ML) solutions, such as clustering or classification based on past examples stored in databases, provide a more reasonable approach. Existing features used for classification include, for example, the use of multiple credit cards for a single Internet Protocol (IP) address, location of a buyer and/or purchase history of a buyer. With fraudulent actors becoming more and more advanced, however, using only such existing transaction attributes as features (e.g., the monetary amount of the transaction and payment method) makes it easier to manipulate a transaction.

Various aspects of the disclosure recognize that many open source datasets exist for extracting contextual spatial features that are more complex and revealing of the intentions of a fraudulent actor. U.S. Pat. No. 8,885,894, for example, describes a biometric verification system that automatically detects and prevents fraudulent transactions based on biometric data, external to the immediate transaction attributes.

As discussed hereinafter, available online data sources exist that can provide extensive information regarding an address from which a purchase was placed and/or an address to which the purchase was billed or delivered. For example, available municipal, governmental and/or private data sources are constantly updated and comprise vast information regarding, for example, land use (e.g., whether or not the area is developed and the density of units for residency). The disclosed spatial features have been found to be indicative of (and/or correlate with) fraudulent activities. These features can be extracted automatically in accordance with the disclosed fraud mitigation techniques, for example, at a regular or semi-regular frequency, and their correlation with fraudulent transactions can be learned using ML methods. For example, it can be shown that for many suspicious orders, the volume and content (e.g., numerous powerful servers) of products are not consistent with the documented land use (e.g., for a given area with a primarily residential land use).

Fraudulent activities in the financial industry, for example, can be detected with existing fraud mitigation techniques by evaluating straightforward and evident signals. Purely rule-based systems entail using algorithms that perform several fraud detection scenarios, typically manually written by fraud analysts. Today, legacy systems apply numerous rules to approve or deny a transaction. Thus, rule-based systems remain too straightforward and can be bypassed by a knowledgeable fraudulent actor. Such rule-based systems require adding/adjusting scenarios manually and generally do not detect implicit correlations. Further, existing rule-based systems often use legacy software that does not adequately process the real-time data streams that are important for the digital space.

ML solutions for fraud detection in electronic transactions have been prevalent for several years. For example, MasterCard integrates ML and artificial intelligence to track and process variables such as a transaction size, location, time, device, and purchase data. Naturally, large transactions or the ones that happen in atypical locations often deserve additional verification. Yet applying such solutions may entail costly missed frauds; unfortunately, using a limited set of transaction features for fraud detection will typically fail to distinguish between erroneous or unusual transactions from real fraudulent actions. For example, duplicating transactions (a common scam method) involves creating transactions close to an original transaction or making a copy of a transaction. Such duplicating transaction scam methods, however, may go unnoticed by existing fraud detection systems. A valid duplicate transaction can occur, for example, if a customer accidentally pushes a submission button twice or simply decides to buy twice as many goods. A naïve system cannot typically differentiate between suspicious duplicate transactions and human errors based only on attributes of a single transaction.

ML solutions for fraud detection are generally superior to rule-based approaches, in the sense that ML solutions can often identify subtle and hidden events in user behavior that may not be evident by manually established rules. The ML algorithm, however, is only as good as the features applied for analysis. There is currently a set of features that are commonly used by ML solutions for identifying fraudulent attempts (such as a larger than average order, a large quantity of the same product, and multiple shipping addresses). With the dramatic shift to the digital space as fraudulent actors are becoming more and more advanced, trivial transaction attributes as flags for fraud (such as the monetary amount of the transaction and/or payment method) are becoming easy for fraudulent actors to manipulate. One straightforward example is to easily fake an IP address from which to perform the fraudulent attempt. In order to block such fraud attempts, companies need to get a broader view and consider the spatial and/or temporal context in which the order has been made.

The fraud mitigation results obtained from naïve ML models working only with limited information can be inaccurate and suffer from false positives as well as false negatives (misses). Despite the proliferation of tools for preventing and managing fraud, the fraud problem continues to grow. The fraud problem refers not just to fraud loss, but also to the cost of "false positives" (e.g., a poor experience for customers falsely rejected for fraud concerns, as well as the labor and time overhead of having staff and software allocated to reviewing orders). This loss of reputation among customers, and personnel cost overhead costs companies a significant amount of money per year that can be mitigated by applying more accurate fraud detection methods, and using more elaborate data in order to detect fraud, as discussed herein.

One or more embodiments of the present disclosure enhance fraud ML models by employing raw spatial data of the transaction to create spatial features using data obtained from available external online datasets (e.g., open data and/or proprietary data).

In some embodiments, in conjunction with other features of the transaction (such as price or product type), these provided spatial features add predictive power to available fraud detection models. For example, a disclosed land use spatial feature can detect a potential fraudulent activity when an order for 10 expensive (e.g., commercial grade) servers are being shipped to a suburban single-family house (which may be more suspicious than if the order being shipped to a commercial industry zone complex).

Figure 1:
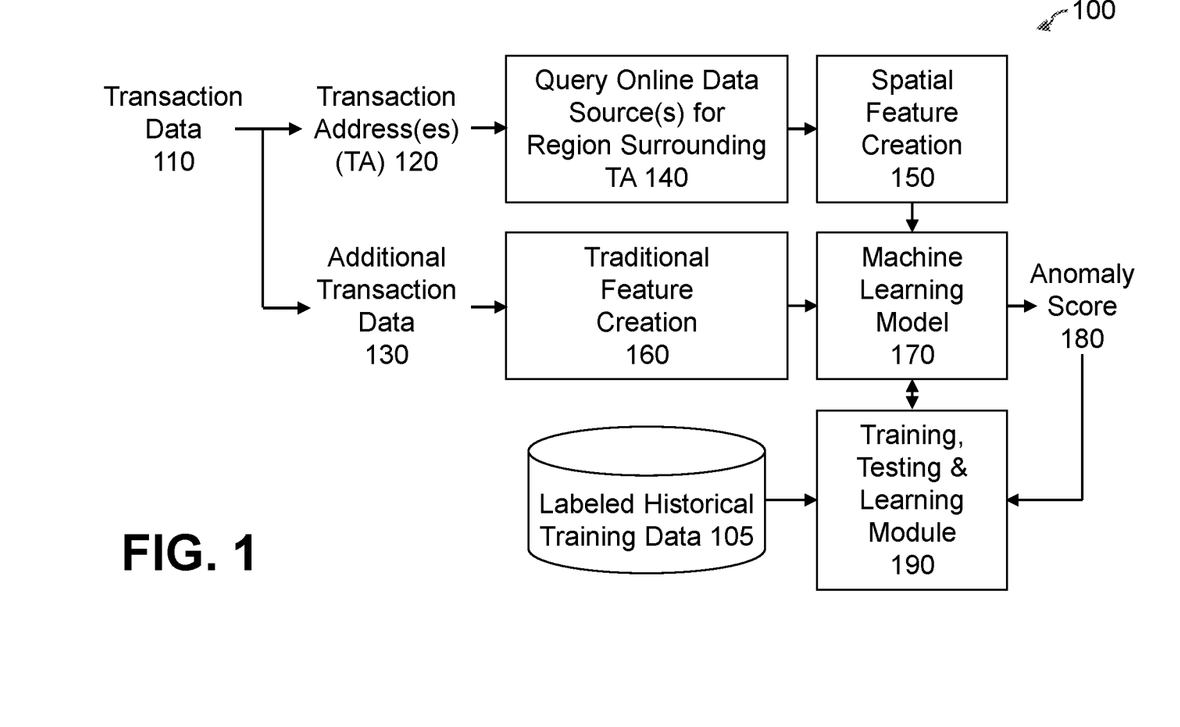
FIG. 1 illustrates an exemplary fraud mitigation system that employs one or more predefined spatial features generated using a transaction address, according to at least one embodiment of the disclosure.

FIG. 1 illustrates an exemplary fraud mitigation system 100 that employs one or more spatial features generated using one or more addresses of a transaction (e.g., order placement address, shipping address and/or billing address), according to at least one embodiment of the disclosure. As shown in FIG. 1, transaction data 110 associated with one or more transactions is processed to extract at least one transaction address 120, as well as additional transaction data 130.

The transaction address 120 is processed by a query module 140 that queries one or more online data sources for a region surrounding the transaction address 120 (e.g., within a predefined radius of the transaction address 120). In some embodiments, the region surrounding the transaction address 120 may be configurable and can optionally vary according to the data type and/or context. For example, the query may determine the permitted land use of, and/or nearest port to, the transaction address 120 and surrounding area, as discussed further below. In further variations, the query may determine crime activity and/or census data for the transaction address 120 and surrounding area, as discussed further below.

A spatial feature creation module 150 processes the query results to determine values for at least one predefined spatial feature for the region surrounding the transaction address 120 in a given geographic area associated with the transaction.

The values for the predefined spatial feature are applied to an ML model 170. In at least some embodiments, the ML model 170 is trained by a training, testing and(/or) learning module 190 using labeled historical training data 105, such as collected transaction data with the disclosed spatial features applied on new data points. For example, the ML model 170 can be trained using transaction data for a plurality of geographic areas to learn a correlation of at least portions of the historical transaction data with fraudulent activity for each geographic area.

In addition, as shown in FIG. 1, the additional transaction data 130 is optionally applied to a traditional feature creation module 160 that determines values for at least one predefined traditional feature for the transaction, in a known manner. The values for any predefined traditional features are applied to the ML model 170.

The ML model 170 generates an anomaly score 180 for the transaction indicating, for example, a likelihood that a given transaction is anomalous. For example, in some embodiments, the anomaly score 180 is compared to one or more predefined thresholds to determine whether a given transaction is anomalous.

The anomaly score 180 for real-time transactions is optionally applied in a feedback manner to the training, testing and learning module 190 on an ongoing basis, after receiving an indication for a given transaction of whether the given transaction is anomalous (e.g., a credit card rejection). In this manner, the transaction data and the corresponding anomaly label are used for online learning of the ML model 170 by the training, testing and learning module 190.

While the following discussion describes a number of exemplary spatial features based on the transaction address 120 according to various embodiments of the disclosure, additional exemplary spatial features based on the transaction address 120 are within the scope of the present disclosure, as would be apparent to a person of ordinary skill in the art based on the present disclosure.

Land Use Distribution Spatial Feature

As noted above, in one or more embodiments, a disclosed land use spatial feature evaluates whether a given geographic area is developed (e.g., primarily commercial or residential development), and/or a density of units for residency, and whether products purchased (and/or services or other aspects of a transaction) for a given transaction are consistent with the determined land use of the transaction address of the transaction, according to a query of the available online data sources.

As noted above in conjunction with FIG. 1, the transaction address 120 is processed by the query module 140 to query the online data source(s) for a region surrounding the transaction address 120 (e.g., within a predefined radius of the transaction address 120). For example, the query radius can be, for example, 150 meters for dense areas, or 300 meters for suburban areas.

In one or more embodiments, the query module 140 queries the land uses of all lots in a radius around the transaction address location (land use open data is widely available in the United States; see, for example, the NYC (New York City) Pluto dataset, or the Austin Land use inventory dataset). In some embodiments, the default querying is based on the count of lots for each land use, but for some implementations, aggregating the land area (e.g., in square meters) of all lots of each land use may be more appropriate, as discussed further below.

Thereafter, the spatial feature creation module 150 calculates one or more land use spatial feature sets, as follows:

i. Log Transformation of Weight of Each Land Use in Queried Area (residential land use will often occupy most of a given area; thus, meaning should be given to subtle changes of low weight land uses, such as community or government buildings, or vacant lots), as follows:

$$LandUse_c = \log\left(\frac{f(X_c)}{\Sigma f(X_c)}\right),$$

where $X_c$ is a vector of lots of land use category c and $f(X)$ is the aggregation function (count instances or summing lots land area).

ii. Total Count (or square meters) of Each Land Use in Queried Area—(total count (or square meters) of each land use in queried area, standardized by the distribution of the corresponding land use in the region (a logical area for comparison such as borough or district) (e.g., how far is one particular area land use X from the average count of land use X in similar sized areas in the region, in terms of standard deviations), as follows:

$$LandUse_c = \frac{f(X_c) - \text{Mean}(f(\text{Region}_c))}{Std(f(\text{Region}_c))},$$

where $X_c$ again is a vector of lots of land use category c and f(X) is the aggregation function (count instances or summing lots land area).

Figure 2:
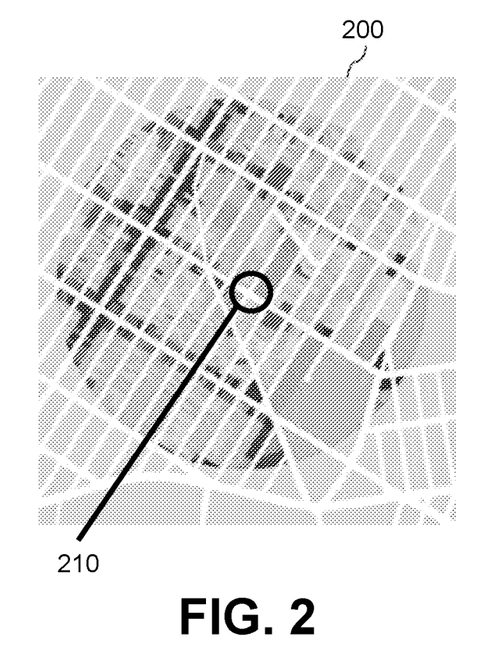
FIG. 2 illustrates a region surrounding a transaction address that is used to determine the predefined spatial features for a corresponding transaction, according to some embodiments.

FIG. 2 illustrates a region 200 surrounding a transaction address 210, according to some embodiments. In the embodiment of FIG. 2, the region 200 surrounding the transaction address 210 comprises the region 200 within a predefined radius of the transaction address 210.

For example, the query may obtain the total count (or square meters) of each land use in the region 200, such as the total count of one or more of the following exemplary land uses: restaurants, retail, industrial, manufacturing, office, automotive, educational, cultural, government, community, recreational, and/or residential (optionally by residential type, such as apartment building, condominium building, single family home).

In some embodiments, portions of the region 200 may be color coded to convey the corresponding land use.

Crime Activity Distribution Spatial Feature

In some embodiments, a disclosed crime activity spatial feature evaluates crime activity for a given geographic area and determines whether incidences of certain crimes (or crime types or classes or distributions) correlate with fraudulent activity.

As noted above in conjunction with FIG. 1, the transaction address 120 is processed by the query module 140 to query the online data source(s) for a region surrounding the transaction address 120 (e.g., within a predefined radius of the transaction address 120). For example, the query radius can be, for example, 150 meters for dense areas, or 300 meters for suburban areas.

In some embodiments, the query module 140 queries the crime activity statistics within the given radius around the transaction address 120. The crime incidents or other crime data in the designated area around the transaction address 120 is typically available, for example, in most American cities, such as Chicago Crime, or through data vendors with a wide coverage of police departments such as CrimeReports.com and SpotCrime.com.

The spatial feature creation module 150 calculates one or more crime activity spatial feature sets by calculating a weight of each major crime type (e.g., theft, vandalism, and assault in the queried geographic area. For example, the spatial feature creation module 150 may determine the percentage of total crimes for each crime type (e.g., a relative weight between each crime type).

Port Proximity Spatial Feature

In at least one embodiment, a disclosed port proximity spatial feature evaluates a proximity of a given transaction address 120 to the nearest shipping port and determines whether certain port proximity distances correlate with fraudulent activity. Generally, one or more aspects of the disclosure recognize that a likelihood of fraud increases as the distance to a shipping port decreases.

Generally, one or more aspects of the disclosure recognize that freight forwarding is often a common practice abused by fraudulent actors, who live outside of a vendor's country, and who want to otherwise mask their true address, by using the legitimacy of the address of a freight forwarder to mask their fraudulent activity. One method to identify freight forwarders is to look for a container label in the shipping address.

The disclosed port proximity spatial feature assumes, in some embodiments, that forwarders will seek a minimal or low truck route (e.g., distance) between a warehouse and a port loading dock.

In at least one embodiments, the query module 140 and spatial feature creation module 150 find a nearest port to the transaction address 120 and calculate a driving route between the transaction address 120 (e.g., the shipping address) and the nearest port (for example, using a popular service provider, such as Google Maps or Mapbox).

The determined driving route between the transaction address 120 and nearest port is applied to the ML model 170, which was trained by the training, testing and(/or) learning module 190 iterate on the labeled historical training data 105 to model a driving distance-fraud relation, for example, by splitting distances to several range bins, and use a target encoding method, in some embodiments, to calculate the anomaly score 180 for each distance range bin.

Figure 3:
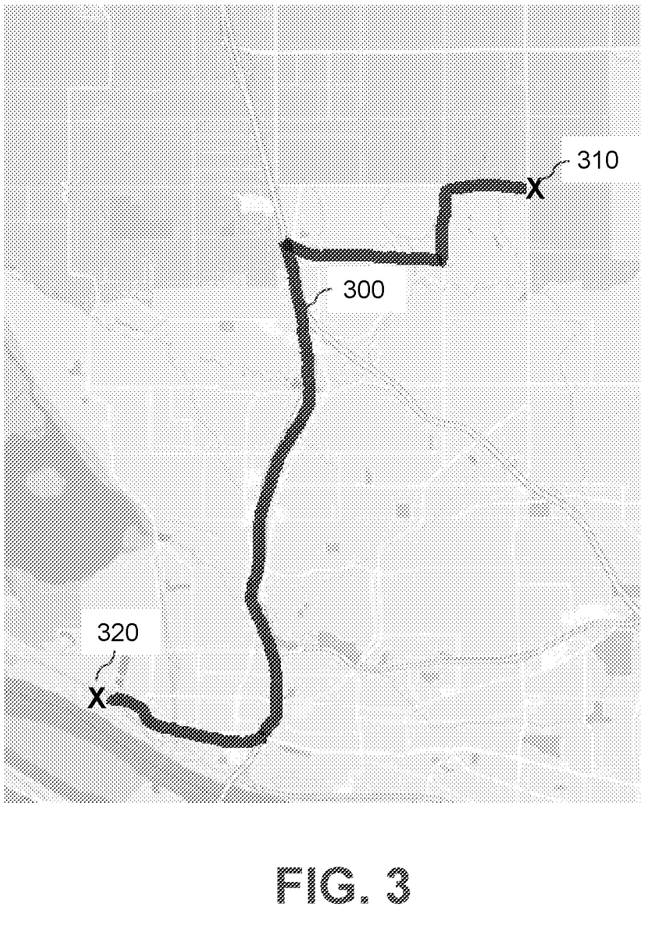
FIG. 3 illustrates a representative driving route between a transaction address and a nearest port, according to one or more embodiments.

FIG. 3 illustrates a representative driving route 300 between a transaction address 310 and a nearest port 320, according to one or more embodiments.

Census Data Spatial Feature

In some embodiments, a disclosed census data spatial feature evaluates certain census statistics, or portions thereof, for a given geographic area and determines whether incidences of certain census segments (or census segment types or census segment classes or census segment distributions) correlate with fraudulent activity. The available census data is analyzed to identify the census features to use for the disclosed census data spatial feature. The United States Census Bureau provides a wide variety of census data, for example, up to a block group resolution, that allows a micro-local analysis.

In some embodiments, the disclosed census data spatial features are based on one or more of the following census portions an Age-Sex distribution, a marital status, an enrollment to school, a presence of children under 18, types of computers in household, presence of internet subscriptions in household and/or types of internet subscriptions in household.

As noted above in conjunction with FIG. 1, the transaction address 120 is processed by the query module 140 to query the online data source(s) for a region surrounding the transaction address 120 (e.g., within a predefined radius of the transaction address 120). For example, the query radius can be, for example, 150 meters for dense areas, or 300 meters for suburban areas.

In one or more embodiments, the query module 140 queries all block groups data (a unit of measurement of the exemplary US Census data; block groups data is one hierarchy down below "census tract" and one above "census block" and comprises several blocks of buildings) in the given radius around the transaction address 120. The spatial feature creation module 150 calculates a weighted average of each feature (e.g., with diminishing weights as going further from transaction address 120). Each feature is optionally standardized in terms of standard deviations from the mean value in the region (e.g., a District or Borough).

Figure 4:
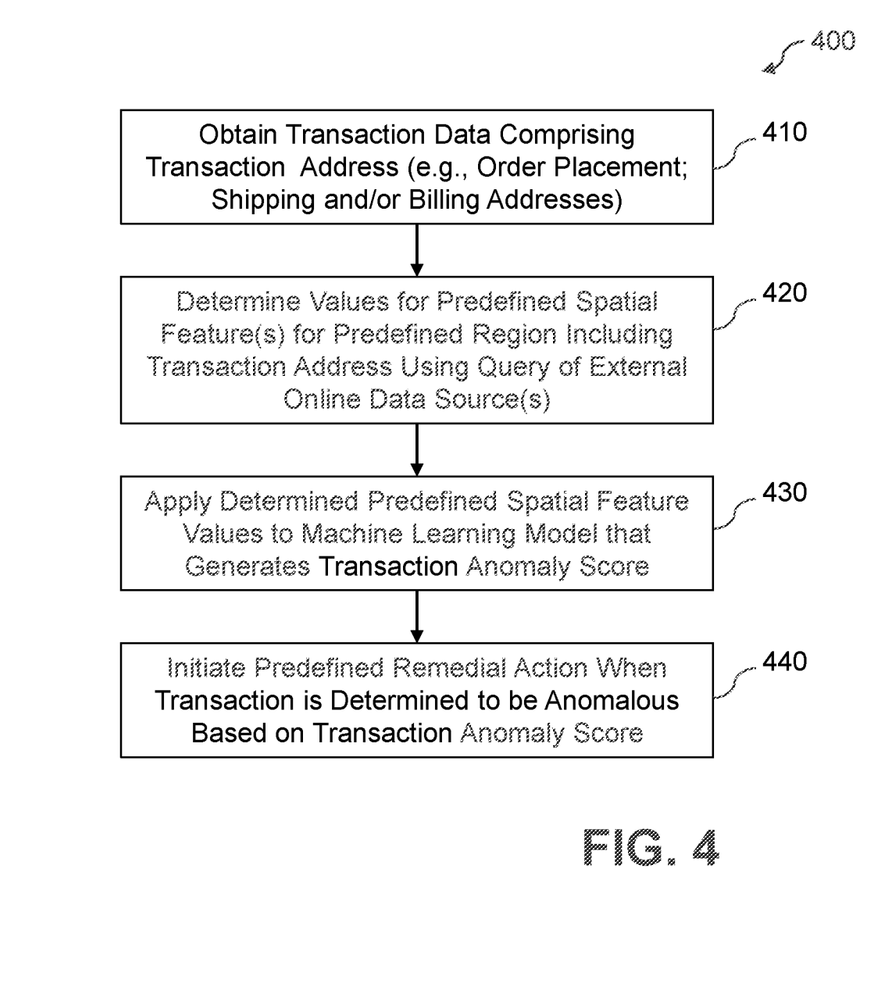
FIG. 4 is a flow chart illustrating an exemplary implementation of a fraud mitigation process using one or more predefined spatial features, according to one embodiment of the disclosure.

FIG. 4 is a flow chart illustrating an exemplary implementation of a fraud mitigation process 400 using one or more predefined spatial features, according to one embodiment of the disclosure. As shown in FIG. 4, the exemplary fraud mitigation process 400 initially obtains transaction data associated with a transaction during step 410. The obtained transaction data comprises a transaction address comprising at least one of an order placement address, a shipping address and a billing address.

During step 420, the exemplary fraud mitigation process 400 determines values for the predefined spatial features for a predefined region that includes the transaction address using a query of at least one external online data source.

The determined values for the predefined spatial features for the transaction are then applied during step 430 to a machine learning module that generates an anomaly score for the transaction. In some embodiments, the machine learning module was trained using transaction data for multiple geographic areas to learn a correlation of at least portions of the transaction data with fraudulent activity for each geographic area.

Finally, the fraud mitigation process 400 initiates one or more a predefined remedial step (and/or a predefined mitigation step) during step 440 when the transaction is determined to be anomalous based on the anomaly score for the transaction.

Upon detection of a predefined anomaly, one or more predefined remedial steps and/or mitigation steps are optionally initiated or executed to address the detected predefined anomalies. For example, the predefined remedial steps and/or mitigation steps to address the detected predefined anomalies may comprise the transmission of an alert or alarm to a user device and/or user for important or suspicious events; isolating, removing, quarantining, limiting permissions, analyzing, and deactivating one or more of the user device and/or one or more files, accounts or aspects of the user device or the user; notifying one or more third party systems (such as sending an email, or generating an alert in another system); restricting one or more accounts and one or more machines from accessing a network, files or folders; initiating a step-up authentication with one or more additional authentication factors; resetting or limiting permissions associated with a file or folder; quarantining one or more files or folders, and preventing one or more further actions from being executed associated with the user device, user account or machine associated with the detected anomalous activity.

One or more aspects of the disclosure recognize that ML models, as opposed to rule-based algorithms, have the ability to capture connections between numerous features, sometimes revealing complex nonlinear and non-intuitive connections inferred from the data.

Among other benefits, ML models are not limited to predefined human or device crafted scenarios, and can process real-time incoming data streams. Thus, an ML model can automatically learn and adjust to new patterns of fraudulent activity more frequently than manual policy updates.

Unfortunately, straightforward commonly used transaction features (such as monetary amount, time of day, device used, and/or IP address) are also commonly known to fraudulent actors who can therefore manipulate them. The disclosed spatial-based features, on the other hand, combine both historical data (e.g., nearby transactions characteristics) and other available external data, such as land use or Census data, do not have methods to outsmart them.

By evaluating a single transaction at a time, and processing the single transaction through a rule-based funnel or even an ML model, crucial information regarding the context in which the transaction was made may be overlooked. For example, it can be shown that while attributes of an individual transaction seemed legitimate, when looking at multiple transactions in a recent time period, the pattern of that bulk might not be a regular pattern fit for that season, day of week and time-of-day.

In a similar manner for the spatial context, if the shipping/billing area type is characterized by transactions of some type, then an anomalous transaction should raise a flag or other alarm. For example, consider the inconsistency suggested by the example of a large number of commercial grade servers sent to a suburban single-family house, as discussed above. Incorporating this information into the fraud mitigation analysis means that available online external datasets can be integrated into fraud prevention solutions, as described herein.

When the fraud detection solution is extended in the manner described herein, with new additional spatial features based on the transaction address, detection accuracy is improved, and the burden of manual human analysis of suspected transactions is reduced. Deploying more accurate, automatic solutions in accordance with the present disclosure will also assist in preventing reputation damage due to misclassified legitimate transactions. Further, when the policy of fraud detection and prevention is improved with the disclosed fraud mitigation techniques, by reducing the number of suspected frauds forwarded for manual inspection by fraud analysts, companies can save significant costs in labor for human analysts and related fraud detection professionals.

Among other benefits, the disclosed techniques for fraud mitigation using one or more enhanced spatial features can prevent and/or mitigate fraudulent activities and thereby save significant amounts of money for organizations. For example, disclosed techniques for fraud mitigation can be leveraged to improve policies for fraud alert, fraud detection and/or fraud analysis.

Thus, the disclosed fraud identification and mitigation techniques can benefit organizations by saving significant amounts of money, by implementing policies for automatically blocking transactions containing suspicious spatial features or feature combinations, or by raising alerts for further inspection by a human of the suspicions transaction.

One or more embodiments of the disclosure provide improved methods, apparatus and computer program products for fraud mitigation techniques using predefined spatial features. The foregoing applications and associated embodiments should be considered as illustrative only, and numerous other embodiments can be configured using the techniques disclosed herein, in a wide variety of different applications.

It should also be understood that the disclosed fraud mitigation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for fraud mitigation using one or more enhanced spatial features may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based fraud mitigation engine 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based fraud mitigation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
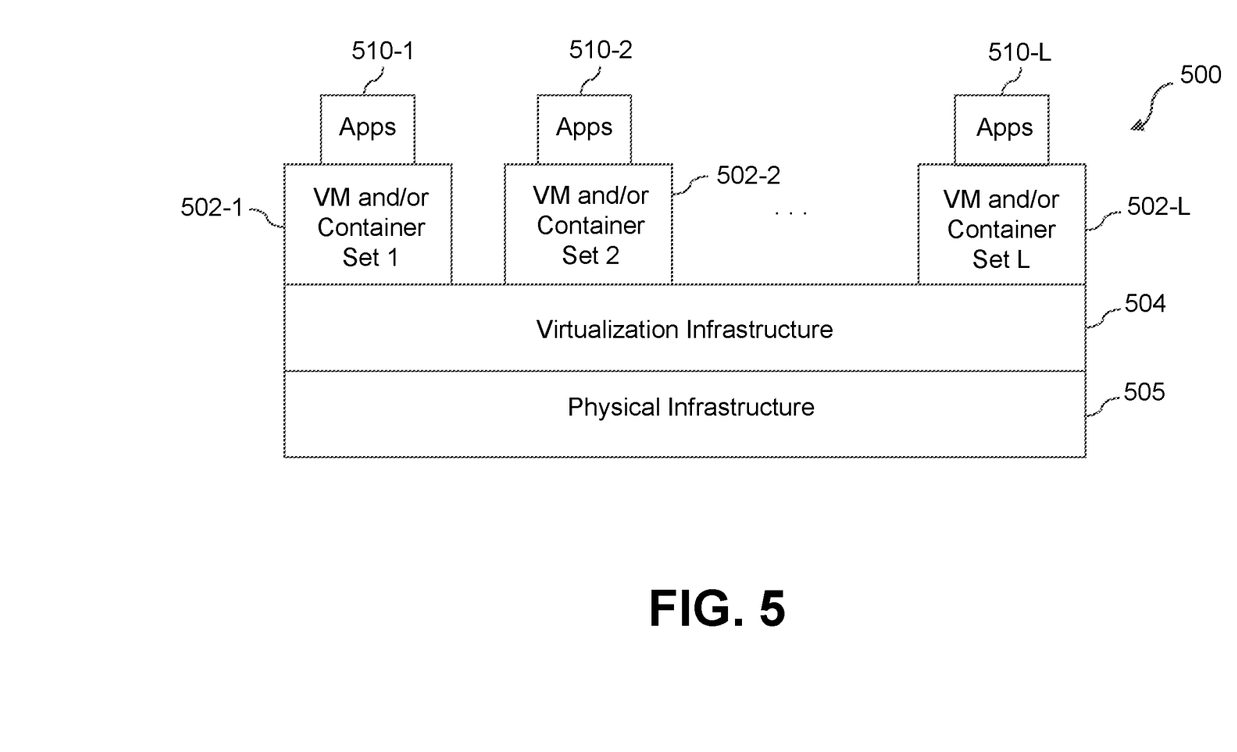
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the fraud mitigation system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide fraud mitigation functionality of the type described above for one or more processes running on a given one of the VMs. For example, each of the VMs can implement fraud mitigation control logic and associated spatial feature generation for providing fraud mitigation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide fraud mitigation functionality of the type described above for one or more processes running on different ones of the containers. For example, a container host device supporting multiple containers of one or more container sets can implement one or more instances of fraud mitigation control logic and associated predefined spatial feature generation for use in fraud mitigation.

As is apparent from the above, one or more of the processing modules or other components of fraud mitigation system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
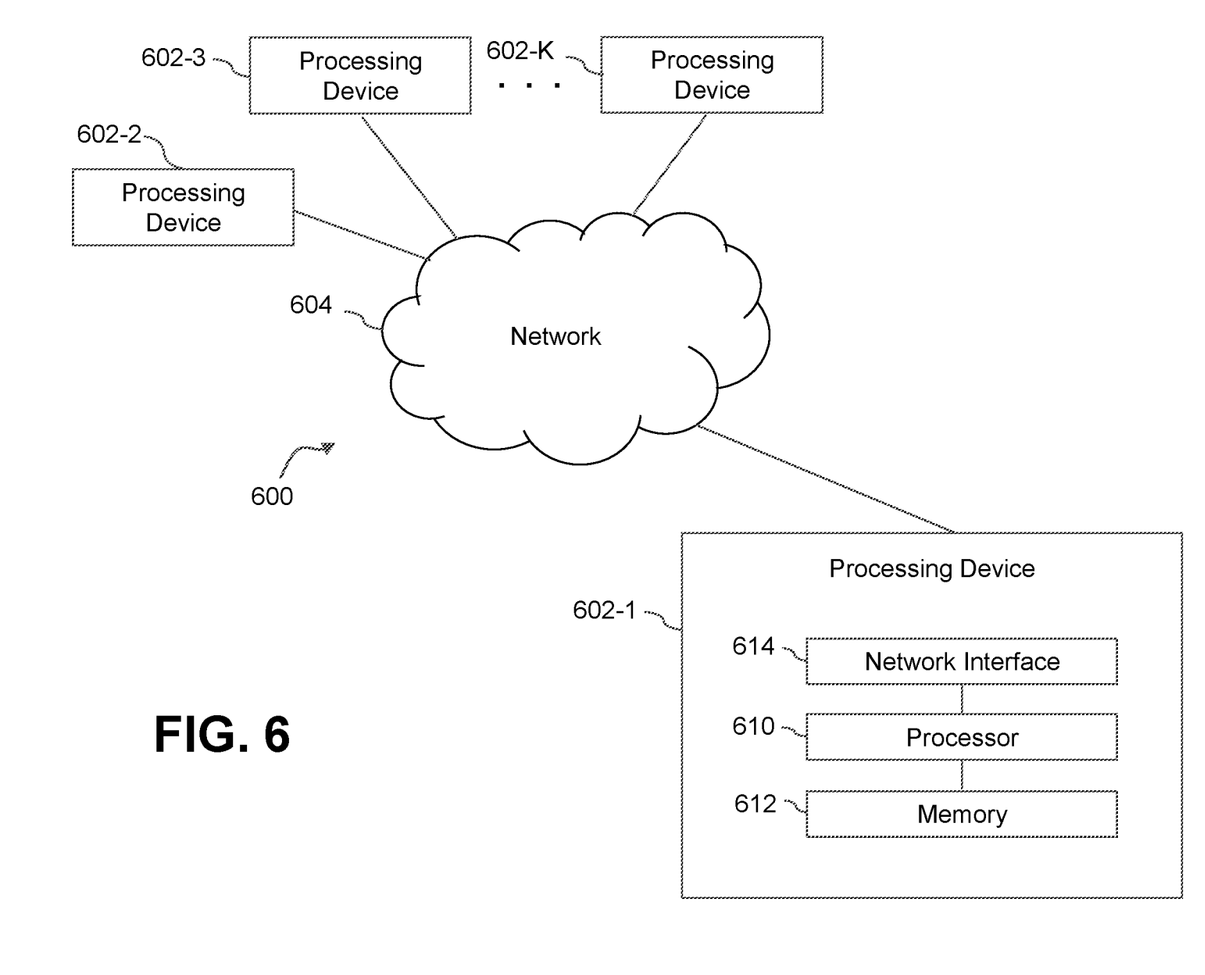
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining transaction data associated with at least one transaction, wherein the transaction data comprises a transaction address comprising at least one of an order placement address, a shipping address and a billing address;
obtaining at least one machine learning module,
wherein the at least one machine learning module is trained using labeled training transaction data for a plurality of geographic areas to learn a correlation of at least a portion of the training transaction data with fraudulent activity for each geographic area;
in response to obtaining the transaction data associated with the at least one transaction:
extracting the transaction address from the transaction data;
determining a given geographic area of the plurality of geographic areas for the at least one transaction based at least in part on the transaction address;
querying at least one external online third-party data source, using a query comprising at least one query parameter derived from the transaction address, to determine values, by processing one or more results of the query, for one or more predefined spatial features for a predefined region that includes the transaction address in the given geographic area;
applying the determined values for the one or more predefined spatial features for the at least one transaction to the at least one machine learning module that generates an anomaly score indicating a likelihood that the at least one transaction is anomalous;
providing one or more of at least a portion of the transaction data, the anomaly score and a predefined anomaly label assigned to the at least one transaction in a feedback manner to update the at least one machine learning module; and
initiating one or more of a predefined automated remedial step and a predefined automated mitigation step in response to the at least one transaction being determined to be at least one of one or more predefined anomalies based at least in part on the anomaly score;
wherein the method is performed by at least one processing device comprising a processor coupled to a memory.

2. The method of claim 1, wherein the at least one external online third-party data source comprises one or more of a municipal data source, a governmental data source and a private data source.

3. The method of claim 1, wherein the one or more predefined anomalies comprise one or more of a risk anomaly and a fraud likelihood anomaly.

4. The method of claim 1, wherein the at least one machine learning module is trained using training transaction data for a plurality of geographic areas labeled with one or more predefined anomaly labels.

5. The method of claim 1, wherein the predefined region that includes the transaction address comprises a predefined area surrounding the transaction address.

6. The method of claim 1, wherein the one or more predefined spatial features comprise a land use feature that determines a land use distribution indicating an anomaly likelihood for a plurality of land uses for at least some of the plurality of geographic areas.

7. The method of claim 1, wherein the one or more predefined spatial features comprise a crime activity feature that determines a crime use distribution indicating an anomaly likelihood for a plurality of crimes for at least some of the plurality of geographic areas.

8. The method of claim 1, wherein the one or more predefined spatial features comprise a port proximity feature that determines a port proximity distribution indicating an anomaly likelihood based at least in part on a distance between at least a portion of the transaction address and a shipping port for at least some of the plurality of geographic areas.

9. The method of claim 1, wherein the one or more predefined spatial features comprise a census data feature that determines a census data distribution indicating an anomaly likelihood for a plurality of census data components for at least some of the plurality of geographic areas.

10. An apparatus comprising:
at least one processing device comprising a processor coupled to a memory;
the at least one processing device being configured to implement the following steps:
obtaining transaction data associated with at least one transaction, wherein the transaction data comprises a transaction address comprising at least one of an order placement address, a shipping address and a billing address;
obtaining at least one machine learning module,
wherein the at least one machine learning module is trained using labeled training transaction data for a plurality of geographic areas to learn a correlation of at least a portion of the training transaction data with fraudulent activity for each geographic area;
in response to obtaining the transaction data associated with the at least one transaction:
extracting the transaction address from the transaction data;
determining a given geographic area of the plurality of geographic areas for the at least one transaction based at least in part on the transaction address;
querying at least one external online third-party data source, using a query comprising at least one query parameter derived from the transaction address, to determine values, by processing one or more results of the query, for one or more predefined spatial features for a predefined region that includes the transaction address in the given geographic area;
applying the determined values for the one or more predefined spatial features for the at least one transaction to the at least one machine learning module that generates an anomaly score indicating a likelihood that the at least one transaction is anomalous;
providing one or more of at least a portion of the transaction data, the anomaly score and a predefined anomaly label assigned to the at least one transaction in a feedback manner for a retraining of the at least one machine learning module; and
initiating one or more of a predefined automated remedial step and a predefined automated mitigation step in response to the at least one transaction being determined to be at least one of one or more predefined anomalies based at least in part on the anomaly score.

11. The apparatus of claim 10, wherein the one or more predefined spatial features comprise a land use feature that determines a land use distribution indicating an anomaly likelihood for a plurality of land uses for at least some of the plurality of geographic areas.

12. The apparatus of claim 10, wherein the one or more predefined spatial features comprise a crime activity feature that determines a crime use distribution indicating an anomaly likelihood for a plurality of crimes for at least some of the plurality of geographic areas.

13. The apparatus of claim 10, wherein the one or more predefined spatial features comprise a port proximity feature that determines a port proximity distribution indicating an anomaly likelihood based at least in part on a distance between at least a portion of the transaction address and a shipping port for at least some of the plurality of geographic areas.

14. The apparatus of claim 10, wherein the one or more predefined spatial features comprise a census data feature that determines a census data distribution indicating an anomaly likelihood for a plurality of census data components for at least some of the plurality of geographic areas.

15. The apparatus of claim 10, wherein the at least one machine learning module is trained using training transaction data for a plurality of geographic areas labeled with one or more predefined anomaly labels.

16. The apparatus of claim 10, wherein the predefined region that includes the transaction address comprises a predefined area surrounding the transaction address.

17. A non-transitory processor-readable storage medium having stored therein program code of one or more software programs, wherein the program code when executed by at least one processing device causes the at least one processing device to perform the following steps:
obtaining transaction data associated with at least one transaction, wherein the transaction data comprises a transaction address comprising at least one of an order placement address, a shipping address and a billing address;
obtaining at least one machine learning module,
wherein the at least one machine learning module is trained using labeled training transaction data for a plurality of geographic areas to learn a correlation of at least a portion of the training transaction data with fraudulent activity for each geographic area;
in response to obtaining the transaction data associated with the at least one transaction:
extracting the transaction address from the transaction data;
determining a given geographic area of the plurality of geographic areas for the at least one transaction based at least in part on the transaction address;
querying at least one external online third-party data source, using a query comprising at least one query parameter derived from the transaction address, to determine values, by processing one or more results of the query, for one or more predefined spatial features for a predefined region that includes the transaction address in the given geographic area;
applying the determined values for the one or more predefined spatial features for the at least one transaction to the at least one machine learning module that generates an anomaly score indicating a likelihood that the at least one transaction is anomalous;

providing one or more of at least a portion of the transaction data, the anomaly score and a predefined anomaly label assigned to the at least one transaction in a feedback manner for a retraining of the at least one machine learning module; and initiating one or more of a predefined automated remedial step and a predefined automated mitigation step in response to the at least one transaction being determined to be at least one of one or more predefined anomalies based at least in part on the anomaly score.

18. The non-transitory processor-readable storage medium of claim 17, wherein the one or more predefined spatial features comprise one or more of a land use feature that determines a land use distribution indicating an anomaly likelihood for a plurality of land uses for at least some of the plurality of geographic areas and a crime activity feature that determines a crime use distribution indicating an anomaly likelihood for a plurality of crimes for at least some of the plurality of geographic areas.

19. The non-transitory processor-readable storage medium of claim 17, wherein the one or more predefined spatial features comprise a port proximity feature that determines a port proximity distribution indicating an anomaly likelihood based at least in part on a distance between at least a portion of the transaction address and a shipping port for at least some of the plurality of geographic areas.

20. The non-transitory processor-readable storage medium of claim 17, wherein the at least one machine learning module is trained using training transaction data for a plurality of geographic areas labeled with one or more predefined anomaly labels.

\* \* \* \* \*